(12) United States Patent
Akarsu et al.

(10) Patent No.: US 8,101,280 B2
(45) Date of Patent: Jan. 24, 2012

(54) ALKALI-RESISTANT COATING ON LIGHT METAL SURFACES

(75) Inventors: Murat Akarsu, Saarbruecken (DE); Ertugrul Arpac, Antalya (TR); Helmut Schmidt, Saarbruecken-Guedingen (DE)

(73) Assignee: EPG (Engineered Nanoproducts Germany) AG, Zweibruecken (DE)

( * ) Notice: Subject to any disclaimer, the term of this patent is extended or adjusted under 35 U.S.C. 154(b) by 148 days.

(21) Appl. No.: 12/444,899

(22) PCT Filed: Oct. 23, 2007

(86) PCT No.: PCT/EP2007/061368
§ 371 (c)(1),
(2), (4) Date: Apr. 9, 2009

(87) PCT Pub. No.: WO2008/049846
PCT Pub. Date: May 2, 2008

(65) Prior Publication Data
US 2010/0003537 A1    Jan. 7, 2010

(30) Foreign Application Priority Data
Oct. 24, 2006  (DE) ................. 10 2006 050 102

(51) Int. Cl.
*B32B 9/00* (2006.01)
*B05D 3/02* (2006.01)
(52) U.S. Cl. .............. 428/469; 428/472; 427/372.2; 427/397.7; 427/419.3; 427/419.4
(58) Field of Classification Search ............ 428/472
See application file for complete search history.

(56) References Cited

U.S. PATENT DOCUMENTS

| | | |
|---|---|---|
| 5,766,680 A | 6/1998 | Schmidt et al. |
| 6,652,669 B1 * | 11/2003 | Reihs et al. ............ 148/241 |
| 6,800,354 B2 | 10/2004 | Baumann et al. |
| 2002/0142150 A1 * | 10/2002 | Baumann et al. ........ 428/328 |
| 2002/0192472 A1 * | 12/2002 | Metz et al. ............... 428/426 |
| 2005/0181195 A1 * | 8/2005 | Dubrow ................. 428/297.4 |
| 2007/0148815 A1 * | 6/2007 | Chao et al. ............... 438/104 |
| 2007/0218297 A1 * | 9/2007 | Jeon et al. ................ 428/447 |
| 2008/0118745 A1 * | 5/2008 | Endres et al. ............. 428/336 |

FOREIGN PATENT DOCUMENTS

DE    100 63 739 A1    6/2002
WO    2005/066388 A2    7/2005

* cited by examiner

*Primary Examiner* — Timothy Speer
(74) *Attorney, Agent, or Firm* — Greenblum & Bernstein, P.L.C.

(57) ABSTRACT

An article which comprises a surface of light metal. The surface is provided with an alkali-resistant protective coat comprising (a) an oxide layer which comprises silicon and boron as a basecoat and (b) an oxide layer which comprises silicon as a vitreous topcoat.

30 Claims, No Drawings

ALKALI-RESISTANT COATING ON LIGHT METAL SURFACES

BACKGROUND OF THE INVENTION

1. Field of the Invention

The present invention relates to an article comprising a surface of light metal that has been provided with an alkali-resistant protective coat, to a method of producing it, and to its use.

2. Discussion of Background Information

Metallic aluminum and its alloys are a much-utilized material in industry, in usage and in the consumer sector. The exclusive reason for this widespread use is that, in spite of the non-precious nature of the metal, it has a relatively high resistance under ambient conditions on account of its capacity for surface passivation. In the course of this passivation an oxide layer is formed which is sufficiently impervious to withstand corrosive attack by moisture. If, however, conditions arise which attack the oxide layer, then the passivation is removed, and the corrosion rapidly advances. This applies to all acidic and basic attacks, i.e., at a pH above or below pH 7. The reason is the amphoteric nature of aluminum oxide, which results in its solubility both in acids and in bases.

Any chemical attack on a solid body is dependent for its reaction rate on the size of the surface. Where there is a high specific surface area, the rate of dissolution is rapid.

A long-established method of protecting aluminum surfaces, especially in conjunction with decorative effects, is that of anodic oxidation. One of the most common methods, known under the brand name "Eloxal", is widespread in industry and practice. In that method, an electrical potential is used to produce—with relative rapidity—an oxide layer into which, as and when required, it is possible to incorporate pigments and produce color effects. The structure of this oxide layer, however, is not compact, but instead more porous, and so offers a high surface area to—for example, an alkaline attack. Consequently these anodic layers are very sensitive to bases. Therefore, at the kind of pH levels prevailing in a machine dishwasher, for example, they are dissolved or attacked at a more or less rapid rate, or they fade.

Because in particular the surface effects produced via anodic oxidation are very important for decorative effects, the production of dishwasher-resistant decorative coats on aluminum surfaces, for example, of the kind that are needed for household utensils, for example, is of great importance.

The literature describes sol-gel processes in which hydrolytically stable oxides are applied in liquid form to a surface and then stabilized thermally, by compaction or hardening, for example.

The attempt to employ such processes in order to stabilize anodic oxide layers, however, has proven not to be practicable, since it is not possible to close off fully the porosity which is inherent in the anodic layers. Consequently it is not possible to prevent penetration of an alkaline medium into the layer and to the interface with the aluminum. Furthermore, it has been found that, when such systems are heated for stabilization to temperatures above 200° C., contraction effects arise in the porous layer that result in cracking. This reduces the chemical resistance still further. The oxides used for these systems have been titanium dioxide or zirconium oxide, both oxides known for their high alkaline resistance.

The object of the present invention, therefore, was to develop a coating system and a technology which on the one hand allows anodically oxidized surfaces to be stabilized but on the other hand is suitable for application to aluminum surfaces even without prior anodic oxidation. Furthermore, the coat ought to be able to be applied in a liquid form and stabilized by a suitable method. The protective coats obtained are to be crack-free and alkali-resistant. A further objective is the production of a transparent protective coat.

This object has been achieved by an alkali-resistant protective coat which is applied to the surface of the light metal and comprises a) an oxide layer of silicon and boron as basecoat and b) an oxide layer of silicon as vitreous topcoat. In this way it is possible, on light metal surfaces, even on porous surface layers of the light metals, to obtain surprisingly crack-free and alkali-resistant protective coats, since the perviousness to alkaline media is strongly restricted, and so the protective coat offers excellent protection against attack by alkaline media. Since the double coat can be applied by wet-chemical methods, the production of the protective coat is simple and inexpensive, moreover. Transparent protective coats can be obtained.

SUMMARY OF THE INVENTION

The present invention provides an article which comprises a surface of light metal. The surface is provided with an alkali-resistant protective coat comprising (a) an oxide layer which comprises silicon and boron as a basecoat and (b) an oxide layer which comprises silicon as a vitreous topcoat.

In one aspect of the article, the light metal may comprise one or more of aluminum, titanium, and magnesium, and an alloy comprising one or more of these metals. For example, the light metal may comprise aluminum and/or an alloy thereof.

In another aspect of the article, the light metal may have been surface-treated.

In yet another aspect, the light metal may comprise an oxide layer of the light metal on its surface. For example, the oxide layer may have formed by itself, or it may have been formed by an anodic oxidation. In particular, the light metal may have been coated with an anodically formed oxide layer into which, optionally, pigments have been incorporated.

In a still further aspect of the article of the invention, the oxide layer of (a) may further comprise titanium.

In another aspect of the article, the atomic ratio Si:B in (a) may be from 32:1 to 1:1 and/or the atomic ratio Si:Ti in (a) may be from 30:1 to 1:1.

In another aspect, the protective coat of the article may be transparent.

In yet another aspect, (a) may consist essentially of an oxide layer of silicon and boron or may consist essentially of an oxide layer of silicon, boron, and titanium.

In a still further aspect of the article, (b) may further comprise color pigments.

In another aspect, the article may be a household article or a part thereof and/or a household utensil or a part thereof, or it may be cutlery or cookware, or it may be a container for a chemical plant or a part thereof.

The present invention also provides a method of producing an alkali-resistant protective coat on an article with a surface which comprises a light metal. The protective coat comprises (a) an oxide layer comprising silicon and boron as a basecoat and (b) an oxide layer comprising silicon as a vitreous topcoat. The method comprises:

(1) forming a base coat by wet-chemically applying a coating composition which comprises a hydrolysate and/or a condensate of one or more hydrolyzable silicon compounds and one or more hydrolyzable boron compounds to the surface of the light metal and subjecting the applied composition to a thermal treatment, and (2) forming a topcoat by wet-chemically applying a coating composition which comprises a hydrolysate and/or a condensate of one or more hydrolyzable silicon compounds, at least one hydrolyzable silicon compound containing at least one non-hydrolyzable organic group, to the basecoat and subjecting the applied composition to a thermal treatment.

The thermal treatment employed in (1) is carried out before (2) and/or concurrently with the thermal treatment employed in (2).

In one aspect of the method, the thermal treatment employed in (1) and/or (2) may be carried out at a temperature of at least 300° C.

In another aspect of the method, the coating composition of (1) may comprise a hydrolysate and/or a condensate of one or more hydrolyzable silicon compounds, one or more hydrolyzable boron compounds, and one or more hydrolyzable titanium compounds.

In yet another aspect, at least one hydrolyzable silicon compound for the coating composition of (1) may comprise at least one non-hydrolyzable organic group. For example, in the hydrolysate and/or condensate in the coating composition of (1) the molar ratio of hydrolyzable silicon compounds having non-hydrolyzable organic groups to hydrolyzable silicon compounds without non-hydrolyzable groups may be from 1:0 to 1:1.

In another aspect of the method of the present invention, at least one hydrolyzable silicon compound for the coating composition of (1) and/or (2) may be a silane which is selected from monoalkylsilanes and dialkylsilanes. For example, at least one hydrolyzable silicon compound for the coating composition of (1) may be a dialkylsilane and/or at least one hydrolyzable silicon compound for the coating composition of (1) may be a monoalkylsilane.

In yet another aspect of the method, the coating composition of (2) may comprise particles and in particular, nanoscale $SiO_2$ particles.

The present invention also provides an article which is obtainable by the method set forth above (including the various aspects thereof).

The present invention also provides a method of rendering a surface which comprises a light metal alkali-resistant. The method comprises applying to the surface a protective coat comprising a double layer composed of (a) an oxide layer comprising silicon and boron and optionally titanium as a basecoat and (b) an oxide layer comprising silicon as a vitreous topcoat.

In one aspect of the method, the surface may be rendered dishwasher-resistant.

DETAILED DESCRIPTION OF THE INVENTION

The article or the surface of the article may be entirely of light metal, or a part or component of the article may possess a surface of light metal, while the remaining parts or components may be of any other materials. Of course, one part having a metal surface may first be provided with the protective coat of the invention, and only then assembled with remaining components to form the article.

The article may have a variety of geometries. One advantage of the invention is that even articles having relatively complex geometries can be provided readily with the protective coat. It is also possible to provide only part of the light metal surface with the protective coat. Thus, for example, the possibility exists of coating only the interior of pots or pipes.

The article to be provided with the protective coat may be any desired article which has a light metal surface. The materials in question may also, for example, be the pure materials, in sheet or panel form, for example, which serve as a raw material for the production of certain articles. The articles in question may come, for example, from the fields of industry, transport, automobile, dairy, pharmacy, sport, everyday requisites, supplies, laboratory or medical. Specific examples are pipes such as conduits, containers, vehicles, medical instruments, appliances or casings or parts thereof. With particular preference the articles are household articles or household utensils, such as, for example, crockery, cutlery, trays, pans, pots, baking sheets, cooking utensils, refrigerators, baking ovens, egg boilers, microwaves, kettles, grills, steamers, ovens, worktops, kitchen and bathroom fittings, housings of (electrical) household appliances, coils, lamps and lights, but especially cutlery and cookware, such as pans or pots, or parts thereof. Particularly suitable articles are those intended for cleaning in dishwashers.

Further examples of articles to be provided with the protective coat are containers for chemical plants or parts thereof, magnesium components, and components of automobiles that are made of Al.

The protective coat is applied to a light metal surface. A light metal is a metal having a density of not more than 5 $g/cm^3$. By light metal is also meant here the alloys of these light metals. Preferred examples are aluminum, magnesium, and titanium and their alloys, with particular preference being given to aluminum and its alloys.

On account of the non-previous nature of the light metals, already explained above, they frequently have an oxide layer on the surface or have been surface-treated, and so there is frequently at least one layer on the surface of the light metals, such as an oxide layer, for example, or another functional layer, such as a passivation coat or decorative coat, such as oxide, phosphate, chromate, zinc-containing or nickel-containing coats. These coats are frequently more or less porous, and so further coating can lead to difficulties. Where appropriate, it is also possible for other coatings to be present, though this is not preferred. The protective coat of the invention is especially suitable when such a porous coat is present on the light metal, since in this case as well it is necessary to apply a crack-free protective coat.

The invention is particularly suitable for light metals which have an oxide layer, especially a porous oxide layer. It is, however, also possible for there to be impervious oxidic passivation coats present, which in general are thin. The oxide layer may form by itself, i.e., as "natural" passivation through oxidation with the oxygen in the environment. With particular preference the light metal, especially Al or an alloy thereof, has an oxide layer formed by anodic oxidation (anodic oxide layer) that has been formed, for example, by the Eloxal® process. Anodic oxide layers of this kind are also used for obtaining surface effects for decorative effects and in that case may comprise, for example, incorporated pigments.

Before the coating composition is applied, the metallic surface may be thoroughly cleaned and in particular freed from grease and dust. Prior to coating it is also possible to carry out a surface treatment, by corona discharge, for example.

The article is provided, on the surface of light metal or a part thereof, with an alkali-resistant protective-coat system composed of two coats, a basecoat and an overlying topcoat. Both coats are applied more particularly by means of a wet-chemical method, i.e., the coating compositions are liquid or pourable, in the form of a solution, dispersion, emulsion or, preferably, sol, for example. The coating compositions comprise a hydrolysate or condensate of hydrolyzable compounds. The hydrolysis or condensation of the hydrolyzable compounds is accomplished preferably by the sol-gel process.

In the course of the hydrolysis and/or condensation, more particularly by the sol-gel process, hydrolyzable compounds are typically hydrolyzed with water, where appropriate with acidic or basic catalysis, and, where appropriate, at least partly condensed. In this context the reaction of salts with water is also considered to be hydrolysis. The hydrolysis and/or condensation reactions lead to the formation of compounds or condensates with hydroxyl groups, oxo groups and/or oxo bridges, which serve as precursors for the oxide layer that is to be formed. Where hydrolyzable compounds of two or more elements are used, it is also possible for condensates to be formed which contain two or more elements, such as Si, B, and, where appropriate, Ti, for example, or different condensates are formed which are each formed essentially of one element. There may be stoichiometric amounts of water used, based on the number of hydrolyzable groups, or else smaller or larger amounts; approximately stoichiometric amounts of water are preferred for the hydrolysis. The hydrolysate and condensate which forms is more particularly a sol and can be adjusted to the viscosity desired for coating compositions by means of suitable parameters, e.g., degree of condensation, solvent or pH. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

The hydrolysis is initiated by addition of water, where appropriate in the presence of a catalyst, preferably an acid. The reaction may be assisted by heating. The duration of the reaction may vary within wide ranges and is dependent, for example, on the amount of water, the temperature, the nature of the starting compounds, and the catalyst. The hydrolyzable compounds may be hydrolyzed together or separately and then united. An alternative option is first to hydrolyze one hydrolyzable compound with water and to add the other hydrolyzable compound to this mixture as a later point in time. The desired amount of water may be added temporally in two or more portions. Moreover, the hydrolysis and condensation may also be carried out in accordance with the modalities that are familiar to the skilled worker.

The coating composition for the basecoat comprises a hydrolysate or condensate of one or more hydrolyzable silicon compounds and one or more hydrolyzable boron compounds. In this context it is expedient to ensure that, in the course of the subsequent compaction of the coat, a sufficient fraction of viscous flow is obtained as a sintering mechanism in order to prevent stresses, with formation of cracks, in the coat. The single or plural hydrolyzable silicon compounds preferably contain at least one nonhydrolyzable organic radical. In one particularly preferred embodiment the coating composition comprises a hydrolyzate or condensate of one or more hydrolyzable silicon compounds, one or more hydrolyzable boron compounds, and one or more hydrolyzable titanium compounds. The use of the additional Ti compounds improves still further the alkali resistance of the protective coat. The hydrolyzable compounds may also be simple salts which are expediently soluble in organic solvents.

As hydrolyzable silicon compounds, here also referred to as silanes, it is preferred to use one or more silanes of the general formula (I)

$$R_nSiX_{4-n} \quad (I)$$

in which the groups X, identical or different from one another, are hydrolyzable groups or hydroxyl groups, the radicals R, identical or different from one another, are nonhydrolyzable organic groups, and n is 0, 1 or 2.

Among the above silanes of the general formula (I) there is preferably at least one silane in whose general formula (I) n has the value of 1 or, preferably, 2. In one preferred embodiment there may be at least two silanes of the general formula (I) used in combination, with one silane having the general formula (I) in which n=1 or, preferably, 2, and one silane having the general formula (I) in which n=0. The molar ratio, based on Si, of silanes of the formula (I) in which n is 1 or 2 to silanes of the formula (I) in which n is 0 is preferably 1:0 to 1:1, preferably 1:0 to 2:1. The ratio 1:0 here means that only silanes having at least one nonhydrolyzable organic radical are used. The at least partial use of silanes having at least one nonhydrolyzable organic radical is advantageous, since it improves the flexibility and further reduces the capacity for cracking.

In the general formula (I), the groups X, which may be alike or different from one another, are hydrolyzable groups or hydroxyl. Examples of hydrolyzable groups X are hydrogen or halogen (F, Cl, Br or I), alkoxy (preferably $C_{1-6}$ alkoxy, such as methoxy, ethoxy, n-propoxy, isopropoxy, and butoxy, for example), aryloxy (preferably $C_{6-10}$ aryloxy, such as phenoxy, for example), acyloxy (preferably $C_{1-6}$ acyloxy, such as acetoxy or propionyloxy, for example), alkylcarbonyl (preferably $C_{2-7}$ alkylcarbonyl, such as acetyl, for example), amino, mono-alkylamino or dialkylamino having preferably 1 to 12, especially 1 to 6, carbon atoms. Preferred hydrolyzable radicals are halogen, alkoxy groups, especially $C_{1-4}$ alkoxy groups such as methoxy, ethoxy, n-propoxy, and isopropoxy, with methoxy or ethoxy groups being particularly preferred.

The groups R in the general formula (I), which if n is 2 may be alike or different, are, for example, hydrogen, alkyl, alkenyl, and alkynyl groups having preferably up to 4 carbon atoms and aryl, aralkyl, and alkaryl groups having preferably 6 to 10 carbon atoms, preference being given to alkyl groups. Specific examples of such groups are methyl, ethyl, n-propyl, isopropyl, n-butyl, sec-butyl, and tert-butyl, vinyl, allyl, and propargyl, phenyl, tolyl, and benzyl. The groups may contain customary substituents, but preferably such groups carry no substituents. Silanes which contain an alkyl group are also referred to as alkylsilanes, or monoalkylsilanes if n=1 and dialkylsilanes if n=2. Preferred groups R are alkyl groups having 1 to 4 carbon atoms, especially methyl and ethyl, and also phenyl.

Examples of silanes of the formula (I) are $Si(OCH_3)_4$, $Si(OC_2H_5)_4$, $Si(O$-n- or i-$C_3H_7)_4$, $Si(OC_4H_9)_4$, $SiCl_4$, $HSiCl_3$, $Si(OOCC_3H)_4$, methyltri(m)ethoxysilane ((m)ethoxy denotes methoxy or ethoxy), methyltripropoxysilane, ethyltri(m)ethoxysilane, phenyltri(m)ethoxysilane, dimethyldi(m)ethoxysilane, and diphenyldi(m)ethoxysilane. Of these silanes, particular preference is given to tetramethoxysilane and tetraethoxysilane (TEOS) for n=0, and methyltriethoxysilane and dimethyldi(m)ethoxysilane for n=1 or 2. For the basecoat it is particularly preferred to use at least one dialkylsilane such as dimethyldiethoxysilane, since in that case the best flexibility and crack resistance are achieved.

Hydrolyzable boron compounds which can be used are compounds of the general formula $BX_3$ (II) where X is an identical or different hydrolyzable group which is preferably as defined in the formula (I). Preferred boron compounds are boron halides, boric acid, and boric esters. Examples are boric acid, $BCl_3$, $B(OCH_3)_3$ and $B(OC_2H_5)_3$.

The hydrolyzable titanium compound which is employed optionally and with preference is more particularly a hydrolyzable compound of formula $TiX4$ (III) where X is an identical or different hydrolyzable group which is preferably as defined in formula (I). Preferred hydrolyzable radicals are alkoxy groups, especially $C_{1-4}$ alkoxy. Specific titanates used with preference are $TiCl_4$, $Ti(OCH_3)_4$, $Ti(OC_2H_5)_4$, $Ti(pentoxy)_4$, $Ti(hexoxy)_4$, $Ti(2-ethylhexoxy)_4$, $Ti(n-OC_3H_7)_4$ or $Ti(i-OC_3H_7)_4$, with preference being given to $Ti(OCH_3)_4$, $Ti(OC_2H_5)_4$, and $Ti(n-$ or $i-OC_3H_7)_4$.

The hydrolysis or condensation can be carried out in the presence of a solvent, such as an organic solvent or water. Organic solvents that are suitable in particular are water-miscible solvents such as, for example, monohydric or polyhydric aliphatic alcohols, preferably an alcohol having 1 to 4 carbon atoms, such as methanol, ethanol, propanol, and isopropanol, for example, ethers (such as diether, for example), esters (such as ethyl acetate, for example), ketones, amides, sulfoxides, and sulfones. Further suitable solvents or cosolvents are, for example, glycols such as ethylene glycol, propylene glycol or butylene glycol. In one preferred embodiment the hydrolysis or condensation can also be carried out in the absence of a solvent. Where alkoxides are used as starting material, the hydrolysis forms alcohols, which may act as solvents.

The amounts of the silicon compounds, boron compounds and, where appropriate, titanium compounds may vary within wide ranges. Preferably, however, the amounts of the silicon and boron starting compounds are preferably selected such that the molar ratio of Si:B is 32:1 to 1:1, preferably 10:1 to 1.2:1, and more preferably 8:1 to 2:1, with particularly good results being obtained, for example, with a ratio of around 4:1. Where hydrolyzable titanium compounds are used as well, the amount is preferably selected such that the molar ratio of Si:Ti is 30:1 to 1:1, preferably 16:1 to 1.3:1, with particularly good results being achieved, for example, with a ratio of around 8:1. The molar ratio B:Ti may be, for example, 5:1 to 1:2, preferably 4:1 to 1:1, with particularly good results being obtained, for example, at a ratio of around 2:1.

The coating composition may where appropriate comprise further components, examples being hydrolyzable compounds or salts of other elements for the matrix, or other additives such as, for example, flow control agents, matting agents, sintering assistants, surfactants, and viscosity improvers. The hydrolyzable compounds of other elements that may be incorporated into the oxide matrix where appropriate are more particularly compounds of at least one element M from main groups III to V and/or transition groups II to IV of the Periodic Table of the Elements. These may be hydrolyzable compounds of Al, Sn, Zr, V, or Zn. Other hydrolyzable compounds as well can be used, such as those of elements of main groups I and II of the Periodic Table (e.g., Na, K, Ca and Mg) and of transition groups V to VIII of the Periodic Table (e.g., Mn, Cr, Fe, and Ni) or hydrolyzable compounds of lanthanides. Generally speaking, however, such other hydrolyzable compounds account, based on the solid oxide content of the completed basecoat or topcoat, for not more than 20%, preferably not more than 5%, and more particularly not more than 2%, by weight.

The coating composition for the topcoat comprises a hydrolysate or condensate of one or more hydrolyzable silicon compounds, at least one hydrolyzable silicon compound containing a nonhydrolyzable organic radical. In one particularly preferred embodiment the coating composition further comprises particles, preferably nanoscale particles, more particularly of a metal oxide or semimetal oxide, such as $SiO_2$.

Suitable hydrolyzable silicon compounds for the topcoat are precisely the same silanes of the general formula (I) that were elucidated above for the basecoat, with at least one silane used for the topcoat being a silane of the general formula (I) in which n has the value of 1 or 2. Use is generally made of at least one silane of the general formula (I) in which n is 0 and of at least one silane in which n is 1 or 2, preferably n being 1, in combination. In that case these silanes are used preferably in a ratio such that the average value of n (of the silanes, on a molar basis) is 0.2 to 1.5, preferably 0.5 to 1.0. Particular preference is given to an average value of n in the range from 0.6 to 0.8.

Silane mixtures of this kind for the topcoat comprise, for example, at least one alkylsilane, such as an alkyltrialkoxysilane, e.g., methyltri(m)ethoxysilane or ethyltri-(m)ethoxysilane, and a tetraalkoxysilane such as tetra(m)ethoxysilane, which are used preferably in a ratio such that the average value of n is situated within the preferred ranges specified above. One particularly preferred combination for the starting silanes of the formula (I) for the topcoat is methyltri(m)ethoxysilane and tetra(m)ethoxysilane. It is assumed that the presence of groups R in the starting silanes serves to prevent excessive crosslinking of the organic $SiO_2$ framework and hence excessive embrittlement.

In one preferred embodiment the coating composition for the topcoat further comprises particles, more particularly nanoscale particles. The particles may have any suitable size, as for example with an average particle diameter of less than 1 μm. By nanoscale particles are meant, preferably, particles having an average diameter of not more than 200 nm, more preferably not more than 100 nm, and in particular not more than 50 nm. The average particle diameter refers to the volume average ($d_{50}$), where a UPA (Ultrafine Particle Analyzer, Leeds Northrup (laser-optical, dynamic laser light scattering)) can be used for the measurement.

The particles are more particularly inorganic particulate solids. Preferably they are particles of metal or semimetal compounds, particularly of metal chalcogenides or semimetal chalcogenides. For these compounds it is possible to use all metals or semimetals (also abbreviated collectively to M below). Preferred metals or semimetals M for the metal or semimetal compounds are, for example, Mg, B, Al, Ga, In, Si, Ge, Sn, Pb, Y, Ti, Zr, V, Nb, Ta, Mo, W, Fe, Cu, Ag, Zn, Cd, Ce, and La, or mixtures thereof. It is possible to use one kind of nanoparticle or a mixture of nanoparticles. The particles may be prepared in different ways, as for example by flame pyrolysis, plasma processes, colloid techniques, sol-gel processes, controlled nucleation and growth processes, MOCVD processes, and emulsion processes. These processes are described comprehensively in the literature.

Examples are (hydrated or unhydrated) oxides such as ZnO, CdO, $SiO_2$, $GeO_2$, $TiO_2$, $ZrO_2$, $CeO_2$, $SnO_2$, $Al_2O_3$ (especially boehmite, AlO(OH), also in the form of aluminum hydroxide), $B_2O_3$, $In_2O_3$, $La_2O_3$, $Fe_2O_3$, $Fe_3O_4$, $Cu_2O$, $Ta_2O_5$, $Nb_2O_5$, $V_2O_5$, $MoO_3$ or $WO_3$; phosphates, silicates, zirconates, aluminates, stannates of metals or semimetals, and corresponding mixed oxides, spinels, ferrites or mixed oxides with perovskite structure such as $BaTiO_3$ and $PbTiO_3$. Preferred particles are $SiO_2$, $Al_2O_3$, AlOOH, $Ta_2O_5$, $ZrO_2$, and $TiO_2$, with $SiO_2$ being the most preferred.

Particles which can be used are, for example, commercial silica products, examples being silica sols, such as the Levasils®, silica sols from Bayer AG, or pyrogenic silicas, examples being the Aerosil products from Degussa. The particulate materials may be used in the form of powders and sols. They may also be formed in situ.

In the case of this preferred embodiment of the method of the invention the particles used in addition to the hydrolyzable silanes of the general formula (I), particularly the above-elucidated combination of silanes with n=0 and silanes with n=1 or 2, more particularly nanoscale $SiO_2$ particles, are used preferably in an amount such that the molar ratio of all the Si atoms in the silanes of the general formula (I) to all the M atoms in the particles, which in the case of $SiO_2$ particles are likewise Si, is in the range from 5:1 to 1:2, more particularly 3:1 to 1:1.

With regard to solvent, hydrolysis and condensation, further components, such as hydrolyzable compounds, the hydrolyzable titanium compounds that are also suitable for the topcoat being the same as those defined for the basecoat, or salts of other elements for the matrix, or other additives for the topcoat, the comments made above for the basecoat apply correspondingly.

To the coating composition for the topcoat it is possible more particularly to add commercial matting agents, examples being microscale $SiO_2$ powders, organic matting agents or ceramic powders, in order to obtain matted coats having antifingerprint properties. The hydrolysis and polycondensation of the silanes may take place in the presence of matting agents where the latter are employed, examples being microscale $SiO_2$ powders or ceramic powders.

In a further embodiment it is possible to admix the coating composition for the topcoat with coloring inorganic pigments as additives as well, in order to obtain color effects. The color pigments may be customary pigments available commercially.

It is of course possible to use all suitable color pigments, especially inorganic color pigments. Comprehensive reviews of suitable color pigments are found, for example, in Ullmanns Encyklopädie der technischen Chemie, 4th edition, vol. 18, pp. 569-645. Examples are black iron oxide pigments, such as FK 3161 (Ferro GmbH, made of Co/Fe/Cr), Black 1G (The Sheperd Coloro Company) and black iron oxide 1310 HR (Liebau Metox GmbH), black carbon pigments, such as Timrex KS4 (Timcal Graphite & Carbon, carbon black paste DINP 25/V and Tack AC 15/200 (Gustav Grolman GmbH & Co. KG), graphite, metal oxide pigments, such as colored iron oxide pigments, chromium oxide pigments, mixed metal oxide pigments (e.g., Ni/Sb/Ti oxide, Co/Al oxide, Mn/Cu/Cr oxide, Fe/Cr oxide), mixtures of metal oxide pigments and graphite, cadmium pigments (e.g., CdS, Cd(S, Se)), bismuth pigments, chromate pigment, such as chromium yellow, chromium green, molybdate red, ultramarine pigments, and Prussian Blue.

When, where appropriate, the viscosity has been adjusted by addition or removal of solvent, the coating compositions of the basecoat and of the topcoat are applied, each by the usual wet-chemical coating processes, to the surface of the light metal that is to be coated. Techniques which can be employed include, for example, dipping, casting, centrifugal coating, spraying, spincoating or brushing.

Following application of the coating composition for the basecoat, it is—if appropriate—dried and then thermally treated in order to form the basecoat. Subsequently the coating composition of the topcoat is applied to the thermally treated basecoat and is treated thermally in order to form the topcoat. This is the preferred procedure. Alternatively, immediately after the basecoat coating composition has been applied, the topcoat coating composition can be applied, and the two coats can be thermally treated jointly, to form the basecoat and topcoat; in this case, before the topcoat coating composition is applied, the applied composition of the basecoat may in fact have been solidified not completely but to a certain degree, by means of drying or by thermal preliminary treatment, at lower temperatures and for a shorter time, for example, without full curing occurring.

The optional drying and the thermal treatment of the two coats may take place essentially in the same way, irrespective of whether a separate or joint thermal treatment is carried out. The remarks below therefore apply to both coats equally.

The applied coating compositions are treated thermally in order to achieve compaction or hardening. Prior to the thermal compaction, the coating composition may be dried at room temperature or at slightly elevated temperature, such as at a temperature of up to 100° C. or up to 80° C., for example.

Although the temperature or final temperature in the case of the thermal treatment must also be guided by the heat resistance of the metallic surface, this temperature is generally at least 300° C., in general at least 350° C., and preferably at least 400° C. or at least 420° C. The final temperature is commonly attained through a gradual increase in temperature, such as with defined increases in temperature within the time interval, for example. Following the thermal treatment, a stabilized—i.e., compacted or hardened—coat is obtained. If the metallic surface is sensitive to oxidation particularly at these high temperatures, it is advisable to carry out the thermal compaction in an oxygen-free atmosphere, such as under nitrogen or argon, for example. Vacuum compaction is also possible. The thermal treatment may where appropriate also take place by means of IR or laser radiation.

The maximum temperatures for the thermal treatment also depend of course on the thermal stability of the articles to be treated, and may range up to a point a little below the softening point of the article. In general the temperatures for the thermal treatment are below 800° C. In general, during the thermal treatment, the organic constituents are burnt out fully, giving purely inorganic coats. The coating compositions may be compacted to form crack-free and transparent coats, even if porous coats are present on the light metal surface that is to be coated.

The heat treatment for compaction may take place for example in an oven, by means of IR irradiation or by flame treatment. The heat treatment anneals the protective coat.

A matrix of oxides or mixed oxides of Si and B ($SiO_2/B_2O_3$) or, where appropriate, Ti ($SiO_2/B_2O_3/TiO_2$) in the basecoat and of Si ($SiO_2$) is obtained which is referred to here as an oxide layer of Si and boron, and, where appropriate, titanium, or as an oxide layer of Si, the stoichiometry being dependent on the molar ratio of the starting compounds employed, as elucidated above. The topcoat is compacted to a vitreous coat. The oxide layer of Si and boron and, where appropriate, titanium, or the oxide layer of Si, optionally comprises further metals or semimetals, if further hydrolyzable compounds of other metals or semimetals are used for the coating composition, as elucidated above. The oxide layers may further comprise additional additives, such as pigments. Through the preferred use of particles in the topcoat it is possible to form a structured phase or coat in which the particle structure of the particles in the surrounding matrix phase comprising the hydrolysate and condensate remains recognizable, which may also be the case, where appropriate, when $SiO_2$ particles are used. The protective coat obtained, comprising two coats, affords extremely good protection against attack by alkaline media.

The protective coat used in accordance with the invention is especially suitable for the coating of the articles identified above. In general the protective coat is glass-clear and transparent and can be applied in such a way as not to alter the appearance of the metallic surface, even if there is a decoration present, as a result of color anodizing, for example. Through the use of matting agents, especially in the topcoat, the appearance may be optimized in terms of the gloss, for instance. The protective coat is also suitable for an antifingerprint finish. The decorative effect of the metallic surfaces, including that of textured surfaces, is retained by virtue of the optically neutral effect of the coating.

The system of the invention is suitable more particularly as an alkali-resistant protective coat for light metal surfaces, and particularly as a dishwasher-resistant protective coat. The examples below illustrate the invention.

EXAMPLES

A. Basecoat

1. DMDEOS/B(OEt)$_3$ System (for Basecoat 1)

3.71 g (0.025 mol) of dimethyldiethoxysilane (DMDEOS) and 0.92 g (0.006 mol) of triethyl borate were mixed and this mixture was subsequently admixed with a mixture of 0.50 g of water and 0.04 g of concentrated hydrochloric acid and stirred at room temperature of 30 minutes. Subsequently 0.45 g of water in 1.1 g of butyl glycol was added to the mixture for full stoichiometric hydrolysis. After 1 hour of stirring, 0.06 g of BYK 306 was added and the resulting coating composition was used for coating as per B.

2. DMDEOS/TEOS/B(OEt)$_3$/Ti(O i-Pr)$_4$ System (for Basecoat 2)

3.71 g (0.025 mol) of dimethyldiethoxysilane (DMDEOS), 0.87 g (0.0042 mol) of tetraethoxysilane (TEOS), and 0.92 g (0.006 mol) of triethyl borate were mixed and this mixture was subsequently mixed with 0.50 g of water and 0.04 g of concentrated hydrochloric acid. The reaction mixture was admixed immediately with 1.04 g (0.0037 mol) of titanium (IV) isopropoxide and the whole was stirred at room temperature for 30 minutes. Subsequently 0.85 g of water in 2 g of butyl glycol was added to the mixture for fully stoichiometric hydrolysis. After 1 hour of stirring, 0.06 g of BYK 306 was added and the coating composition obtained was used for coating as per B.

3. DMDEOS/TEOS/B(OEt)$_3$/Ti(O i-Pr)$_4$ System (for Basecoat 3)

3.71 g (0.025 mol) of dimethyldiethoxysilane (DMDEOS), 0.87 g (0.0042 mol) of tetraethoxysilane (TEOS), and 0.92 g (0.006 mol) of triethyl borate are mixed and this mixture is subsequently admixed with 0.50 g of water and 0.04 g of concentrated acid and the whole is stirred at room temperature for 30 minutes. Subsequently 0.72 g of water in 1.65 g of butyl glycol is added to the mixture for fully stoichiometric hydrolysis. After 1 hour of stirring, 0.06 g of BYK 306 is added and the coating composition obtained is used for coating as per B.

B. Coating with Basecoats 1 to 3

Tefal pots were coated in each case with systems 1 to 3. The solutions for the basecoat were filtered prior to coating (1.2 μm pore size). The pots had been cleaned with alcohol beforehand. The coats were cured in each case with a heating rate of 1° K/min at 450° C. This gave basecoats 1 to 3.

C. Topcoat

MTEOS/TEOS/Levasil 300-30 System (for Topcoat)

8.9 g (0.05 mol) of methyltriethoxysilane (MTEOS), 2.6 g (0.0125 mol) of tetraethoxysilane (TEOS) and 1.93 g of Levasil 300-30 (Bayer) were mixed and this mixture was subsequently admixed with 0.08 g of concentrated hydrochloric acid. The mixture was stirred at room temperature for 30 minutes. Subsequently 1.41 g of water were added to the mixture for fully stoichiometric hydrolysis. After 15 minutes of stirring, 0.19 g of matting agent OK 500 (SiO$_2$ particles, Degussa) was added to the mixture, followed by stirring for 1 hour.

The parts precoated with basecoats 1 to 3 as per B were each recoated with the above coating composition for the topcoat. The coats were cured with a heating rate of 1° K/min at 450° C. This gave the protective coats 1 to 3.

D. Comparative Example

A Tefal pot was provided in the same way as described under C with a topcoat, without application of a basecoat beforehand.

E. Testing

Protective coats 1 to 3 were all crack-free. In comparison, the coat applied in accordance with the comparative example (topcoat without basecoat) showed cracks, and so it was not possible therewith to obtain sufficient base resistance.

The base resistance of protective coats 1 to 3 was tested by exposing them to a 4% NaOH solution at 60° C. for four times 5 minutes. All the protective coats showed good resistance, with protective coat 2 (Ti-containing basecoat 2 and topcoat) being even more stable than protective coats 1 and 3 (basecoat 1 and topcoat, and basecoat 3 and topcoat, respectively).

What is claimed is:

1. An article comprising a surface of light metal, wherein the light metal is selected from aluminum, magnesium, and alloys thereof, and the surface of the article is provided with an alkali-resistant protective coat comprising (a) an oxide layer comprising silicon and boron as a basecoat and (b) an oxide layer comprising silicon as a vitreous inorganic topcoat.

2. The article of claim 1, wherein the light metal comprises at least one of magnesium and an alloy thereof.

3. The article of claim 1, wherein the light metal comprises at least one of aluminum and an alloy thereof.

4. The article of claim 3, wherein the light metal has been coated with an anodically formed oxide layer into which, optionally, pigments have been incorporated.

5. The article of claim 1, wherein the light metal has been surface-treated.

6. The article of claim 1, wherein the light metal comprises an oxide layer of the light metal on its surface.

7. The article of claim 6, wherein the oxide layer has formed by itself.

8. The article of claim 6, wherein the oxide layer has been formed by an anodic oxidation.

9. The article of claim 1, wherein the oxide layer of (a) further comprises titanium.

10. The article of claim 1, wherein an atomic ratio Si:B in (a) is from 32:1 to 1:1.

11. The article of claim 9, wherein an atomic ratio Si:Ti in (a) is from 30:1 to 1:1.

12. The article of claim 1, wherein the protective coat is transparent.

13. The article of claim 1, wherein (a) consists essentially of an oxide layer of silicon and boron or of silicon, boron, and titanium.

14. The article of claim 1, wherein (b) further comprises color pigments.

15. The article of claim 1, wherein the article is selected from cutlery, crockery, trays, pans, pots, backing sheets, and parts thereof.

16. The article of claim 1, wherein the article is a container holding alkaline chemical substances or a part thereof.

17. The article of claim 1, wherein the surface is textured.

18. A method of producing an alkali-resistant protective coat on an article having a surface which comprises a light metal selected from aluminium, magnesium, and alloys thereof, wherein the protective coat comprises (a) an oxide layer comprising silicon and boron as a basecoat and (b) an oxide layer comprising silicon as a vitreous inorganic topcoat, and wherein the method comprises (1) forming a basecoat by wet-chemically applying a coating composition which comprises at least one of a hydrolysate or a condensate of one or more hydrolyzable silicon compounds and one or more hydrolyzable boron compounds to the surface of the light metal and subjecting the applied composition to a thermal treatment, and (2) forming a topcoat by wet-chemically applying a coating composition which comprises at least one of a hydrolysate and a condensate of one or more hydrolyzable silicon compounds, at least one hydrolyzable silicon compound containing at least one non-hydrolyzable organic group, to the basecoat and subjecting the applied composition to a thermal treatment, the thermal treatment of (1) being carried out at least one of prior to (2) and concurrently with the thermal treatment of (2).

19. The method of claim 18, wherein the thermal treatment of at least one of (1) and (2) is carried out at a temperature of at least 300° C.

20. The method of claim 18, wherein the coating composition of (1) comprises at least one of a hydrolysate or a condensate of one or more hydrolyzable silicon compounds, one or more hydrolyzable boron compounds, and one or more hydrolyzable titanium compounds.

21. The method of claim 18, wherein at least one hydrolyzable silicon compound for the coating composition of (1) comprises at least one non-hydrolyzable organic group.

22. The method of claim 21, wherein in the at least one of a hydrolysate and a condensate in the coating composition of (1) a molar ratio of hydrolyzable silicon compounds having non-hydrolyzable organic groups to hydrolyzable silicon compounds without non-hydrolyzable groups is from 1:0 to 1:1.

23. The method of claim 18, wherein at least one hydrolyzable silicon compound for the coating composition of at least one of (1) and (2) is a silane which is selected from monoalkylsilanes and dialkylsilanes.

24. The method of claim 18, wherein at least one hydrolyzable silicon compound for the coating composition of (1) is a dialkylsilane.

25. The method of claim 18, wherein at least one hydrolyzable silicon compound for the coating composition of (1) is a monoalkylsilane.

26. The method of claim 18, wherein the coating composition of (2) comprises particles.

27. The method of claim 26, wherein the particles comprise nanoscale $SiO_2$ particles.

28. An article which is obtainable by the method of claim 18.

29. A method of rendering a surface which comprises a light metal selected from aluminium, magnesium, and alloys thereof alkali-resistant, wherein the method comprises applying to the surface a protective coat comprising a double layer composed of (a) an oxide layer comprising silicon and boron and optionally titanium as a basecoat and (b) an oxide layer comprising silicon as a vitreous inorganic topcoat.

30. The method of claim 29, wherein the surface is rendered dishwasher-resistant.

* * * * *